US012809617B2

(12) United States Patent
Chyan et al.

(10) Patent No.: US 12,809,617 B2
(45) Date of Patent: Nov. 24, 2026

(54) METHOD AND NON-TRANSITORY COMPUTER-READABLE STORAGE MEDIUM AND APPARATUS FOR IMPROVING PERFORMANCE BASED ON ARTIFICIAL INTELLIGENCE ENGINE

(71) Applicant: Silicon Motion, Inc., Zhubei City (TW)

(72) Inventors: Yu-Wei Chyan, Hsinchu City (TW); Sheng-I Hsu, Hsinchu County (TW); Shii-Tyng Duann, Taipei City (TW)

(73) Assignee: SILICON MOTION, INC., Zhubei City (TW)

( * ) Notice: Subject to any disclaimer, the term of this patent is extended or adjusted under 35 U.S.C. 154(b) by 46 days.

(21) Appl. No.: 19/022,496

(22) Filed: Jan. 15, 2025

(65) Prior Publication Data

US 2025/0291581 A1 Sep. 18, 2025

Related U.S. Application Data

(60) Provisional application No. 63/565,241, filed on Mar. 14, 2024.

(30) Foreign Application Priority Data

Sep. 4, 2024 (CN) ......................... 202411234001.2

(51) Int. Cl.
*G06F 8/654* (2018.01)
*G06F 12/02* (2006.01)

(52) U.S. Cl.
CPC .......... *G06F 8/654* (2018.02); *G06F 12/0246* (2013.01); *G06F 2212/7207* (2013.01)

(58) Field of Classification Search
CPC ......... G06F 12/0246; G06F 2212/7205; G06F 2212/7207; G06F 8/654
See application file for complete search history.

(56) References Cited

U.S. PATENT DOCUMENTS 11,436,023 B2 9/2022 Sears et al.
2020/0057561 A1 2/2020 Lai et al.
(Continued)

FOREIGN PATENT DOCUMENTS

TW 202009713 A 3/2020
TW 202207031 A 2/2022
(Continued)

*Primary Examiner* — Jane W Benner
(74) *Attorney, Agent, or Firm* — Birch, Stewart, Kolasch & Birch, LLP

(57) ABSTRACT

The invention introduces a method for improving performance based on an artificial intelligence (AI) engine, performed by a processing unit, which includes: generating a value of a first-category parameter according to a command and an argument that a host side interacts with a flash controller; generating a value of a second-category parameter according to a software status and a firmware status of the flash controller; generating a value of a third-category parameter according to a status of the flash module, thereby enabling a prediction model running in the AI engine to generate prediction results in classes according to the values of the first-category, the second-category and the third-category parameter; and adjusting a setting of a process being performed in the flash controller according to the prediction results in the classes.

23 Claims, 8 Drawing Sheets

(56) References Cited

U.S. PATENT DOCUMENTS

| | | | | |
|---|---|---|---|---|
| 2020/0133898 | A1* | 4/2020 | Therene | G06F 3/061 |
| 2021/0303978 | A1 | 9/2021 | Nagarajan et al. | |
| 2022/0319606 | A1 | 10/2022 | Sarpatwari et al. | |
| 2022/0392516 | A1 | 12/2022 | Cha et al. | |
| 2023/0237307 | A1 | 7/2023 | Hsu et al. | |
| 2024/0232067 | A1* | 7/2024 | Wu | G06F 12/0238 |
| 2025/0315167 | A1* | 10/2025 | Redaelli | G06F 3/0619 |

FOREIGN PATENT DOCUMENTS

| | | | |
|---|---|---|---|
| TW | 202244936 | A | 11/2022 |
| TW | 202249023 | A | 12/2022 |
| TW | 202341010 | A | 10/2023 |

* cited by examiner (A)

(B)

METHOD AND NON-TRANSITORY COMPUTER-READABLE STORAGE MEDIUM AND APPARATUS FOR IMPROVING PERFORMANCE BASED ON ARTIFICIAL INTELLIGENCE ENGINE

CROSS-REFERENCE TO RELATED APPLICATIONS

This application claims the benefit of priority to U.S. Provisional Application Ser. No. 63/565,241, filed on Mar. 14, 2024; Patent Application No. 202411234001.2, filed in China on Sep. 4, 2024; the entirety of which is incorporated herein by reference for all purposes.

BACKGROUND

The disclosure generally relates to storage devices and, more particularly, to a method, a non-transitory computer-readable storage medium and an apparatus for improving performance based on an artificial intelligence (AI) engine.

Flash memory devices typically include NOR flash devices and NAND flash devices. NOR flash devices are random access—a host side accessing a NOR flash device can provide the device any address on its address pins and immediately retrieve data stored in that address on the device's data pins. NAND flash devices, on the other hand, are not random access but serial access. It is not possible for NAND to access any random address in the way described above. Instead, the host side has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation), and not a single byte or word. How to improve the performance of accessing NAND flash memory, such as the programming speed of host data, the reading speed of host data, the stability of stored data, and the utilization rate of storage space, have always been important issues for flash controllers.

SUMMARY

In an aspect of the invention, an embodiment introduces a method for improving performance based on an artificial intelligence (AI) engine, performed by a processing unit, to include the following steps: generating a value of a first-category parameter according to a command and an argument that a host side interacts with a flash controller; generating a value of a second-category parameter according to a software status and a firmware status of the flash controller; generating a value of a third-category parameter according to a status of the flash module, thereby enabling a prediction model running in the AI engine to generate prediction results in a plurality of classes according to the value of the first-category parameter, the value of the second-category parameter and the value of the third-category parameter; and adjusting a setting of a process being performed in the flash controller according to the prediction results in the classes.

The flash controller comprises the processing unit and the AI engine. The flash controller is coupled to a host side and a flash module. A training server uses a machine learning algorithm to generate the prediction model according to training data.

In another aspect of the invention, an embodiment introduces a non-transitory computer-readable storage medium having stored therein program code that, when loaded and executed by a processing unit, causes the processing unit to perform the method for improving performance based on an AI engine, as described above.

In still another aspect of the invention, an embodiment introduces an apparatus for improving performance, to include: an AI engine; and a processing unit, coupled to the AI engine. The processing unit is arranged operably to: generate a value of a first-category parameter according to a command and an argument that the host side interacts with the flash controller; generate a value of a second-category parameter according to a software status and a firmware status of the flash controller; generate a value of a third-category parameter according to a status of the flash module, thereby enabling a prediction model running in the AI engine to generate prediction results in a plurality of classes according to the value of the first-category parameter, the value of the second-category parameter and the value of the third-category parameter; and adjust a setting of a process being performed in the flash controller according to the prediction results in the classes.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Certain aspects and embodiments of this disclosure are provided below. Some of these embodiments may be applied independently and some of them may be applied in conjunction as would be apparent to those of skill in the art. In the following description, for the purposes of explanation, specific details are set forth in order to provide a thorough understanding of aspects of the application. However, it will be apparent that various embodiments may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that changes may be made in the function and arrangement of elements without departing from the spirit and scope of the application as set forth in the claims.

Figure 1:
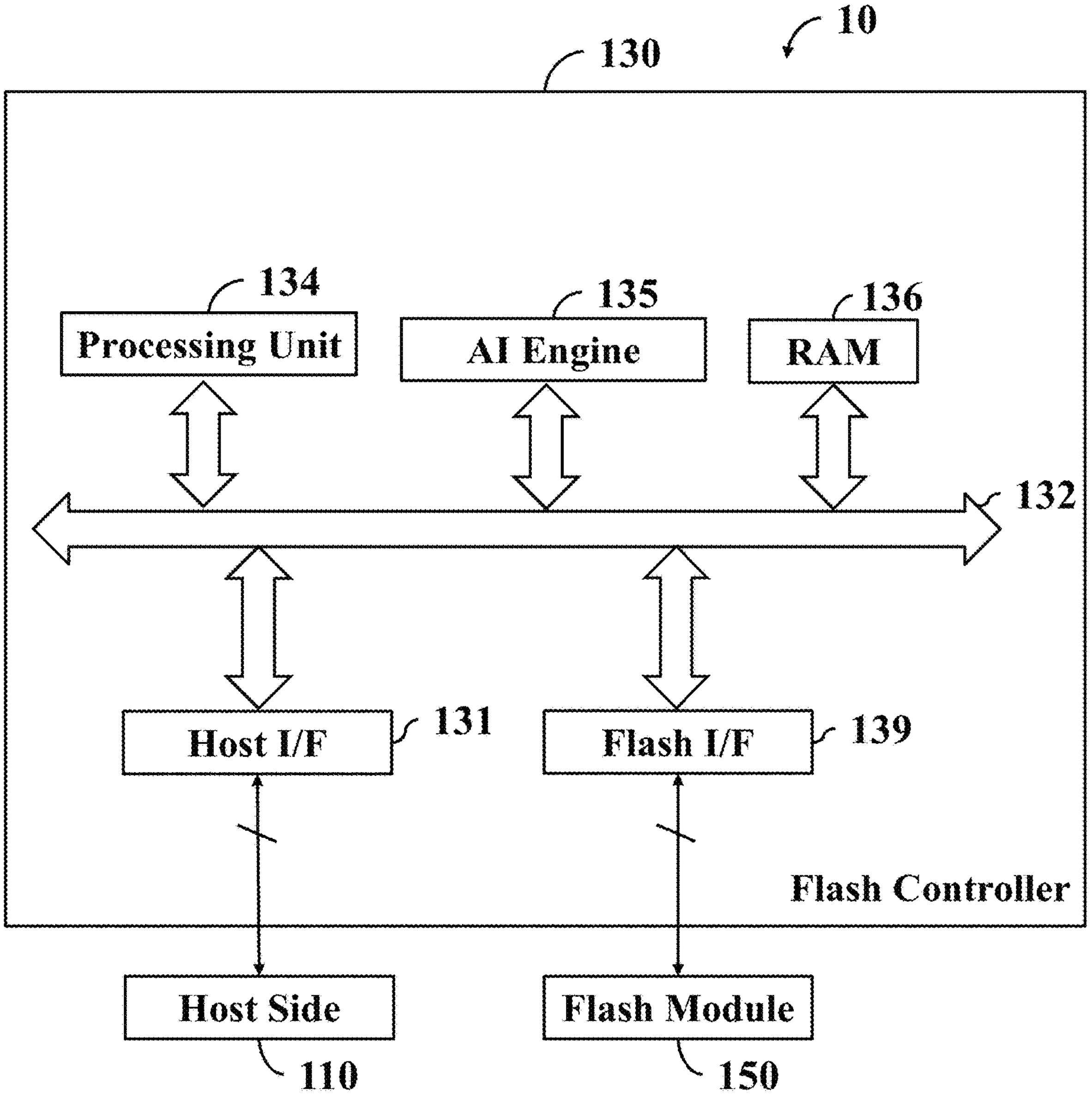
FIG. 1 is the system architecture of an electronic apparatus according to an embodiment of the invention.

Refer to FIG. 1. The electronic apparatus 10 includes the host side 110, the flash controller 130 and the flash module 150, and the flash controller 130 and the flash module 150 may be collectively referred to as a device side. The electronic apparatus 10 may be equipped with a Personal Computer (PC), a laptop PC, a tablet PC, a mobile phone, a digital camera, a digital recorder, a smart television, a smart freezer, an automotive electronics system or other consumer electronic products. The host side 110 and the host interface (I/F) 131 of the flash controller 130 may communicate with each other by Universal Serial Bus (USB), Advanced Technology Attachment (ATA), Serial Advanced Technology Attachment (SATA), Peripheral Component Interconnect Express (PCI-E), Universal Flash Storage (UFS), Embedded Multi-Media Card (eMMC) protocol, or others. The flash I/F 139 of the flash controller 130 and the flash module 150 may communicate with each other by a Double Data Rate (DDR) protocol, such as Open NAND Flash Interface (ONFI), DDR Toggle, or others. The flash controller 130 includes the processing unit 134 and the processing unit 134 may be implemented in numerous ways, such as with general-purpose hardware (e.g., a microcontroller unit, a single processor, multiple processors or graphics processing units capable of parallel computations, or others) that is programmed using firmware and/or software instructions to perform the functions recited herein. The processing unit 134 may receive host commands from the host side 110 through the host interface (I/F) 131, such as write commands, read commands, etc., schedule and execute the host commands. The flash controller 130 includes the Random Access Memory (RAM) 136, which may be implemented in a Dynamic Random Access Memory (DRAM), a Static Random Access Memory (SRAM), or the combination thereof, for allocating space as a data buffer storing user data (also referred to as host data) that has been obtained from the host side 110 and is to be programmed into the flash module 150, and that has been read from the flash module 150 and is to be output to the host side 110. The RAM 136 stores necessary data in execution, such as variables, data tables, data abstracts, host-address to flash-address mapping (H2F) tables, flash-address to host-address mapping (F2H) tables, or others. The flash I/F 139 includes a NAND flash controller (NFC) to provide functions that are required to access to the flash module 150, such as a command sequencer, a Low Density Parity Check (LDPC) encoder/decoder, etc.

The flash controller 130 may be equipped with the bus architecture 132 to couple components to each other to transmit data, addresses, control signals, etc. The components include but not limited to the host I/F 131, the processing unit 134, the Artificial Intelligence (AI) engine 135, the RAM 136 and the flash I/F 139. A direct memory access (DMA) circuitry of a component moves data between specific components through the bus architecture 132 according to instructions or control signals. For example, a DMA circuitry of the host I/F 131 or the flash I/F 139 may migrate data in a specific data buffer thereof to a specific address of the RAM 136, migrate data in a specific address of the RAM 136 to a specific data buffer thereof, and so on.

The flash module 150 provides huge storage space typically in hundred Gigabytes (GBs), or even several Terabytes (TBs), for storing a wide range of user data, such as high-resolution images, video files, etc. The flash module 150 includes control circuitries and memory arrays containing memory cells, such as being configured as Single Level Cells (SLCs), Multi-Level Cells (MLCs), Triple Level Cells (TLCs), Quad-Level Cells (QLCs), or any combinations thereof. The processing unit 134 programs user data into a designated address (a destination address) of the flash module 150 and reads user data from a designated address (a source address) thereof through the flash I/F 139. The flash I/F 139 may use several electronic signals including a data line, a clock signal line and control signal lines for coordinating the command, address and data transfer with the flash module 150. The data line may be used to transfer commands, addresses, read data and data to be programmed; and the control signal lines may be used to transfer control signals, such as Chip Enable (CE), Address Latch Enable (ALE), Command Latch Enable (CLE), Write Enable (WE), etc.

Figure 2:
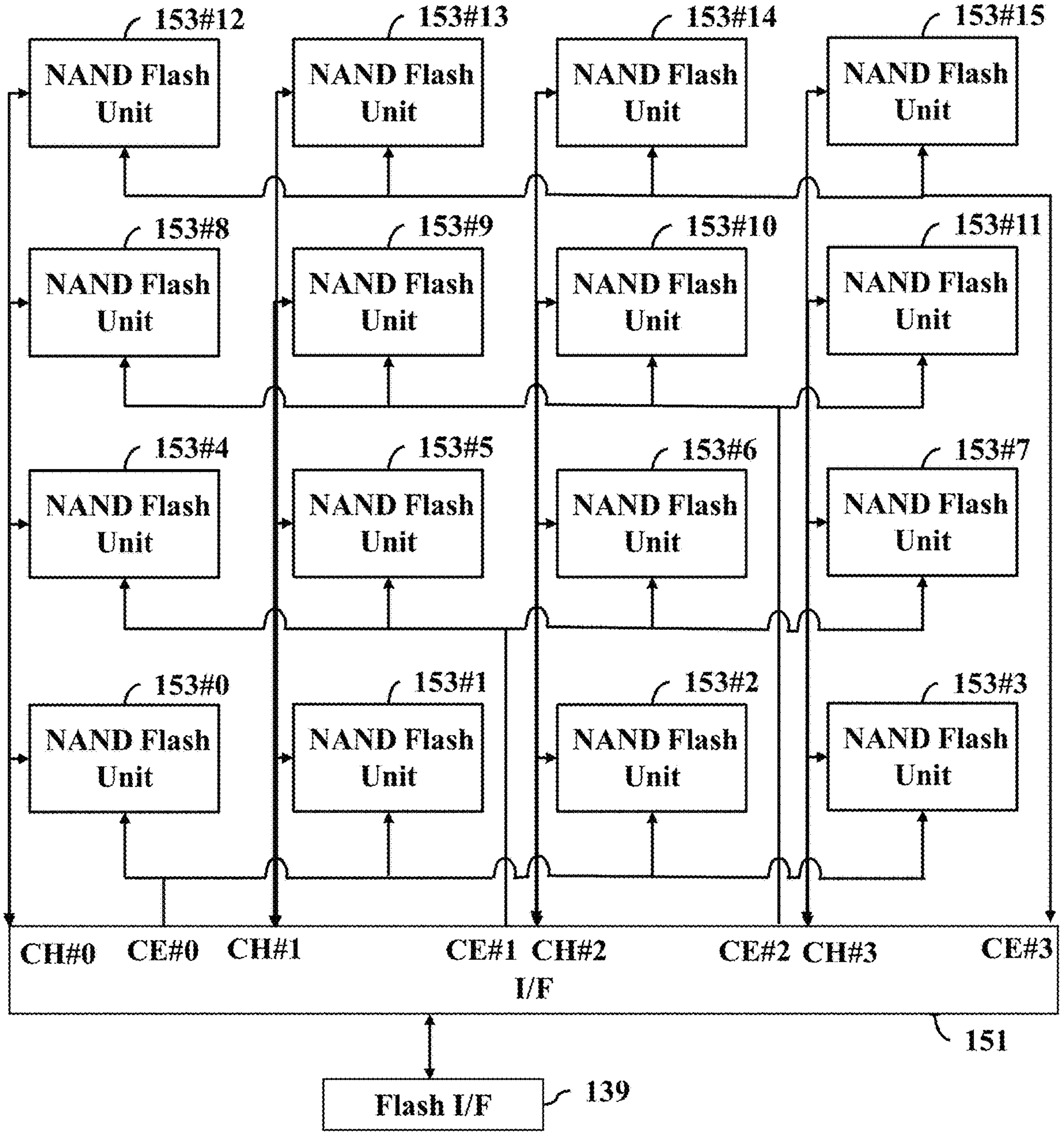
FIG. 2 is a schematic diagram illustrating a flash module according to an embodiment of the invention.

Refer to FIG. 2. The I/F 151 of the flash module 150 may include four I/O channels (hereinafter referred to as channels) CH #0 to CH #3 and each is connected to four NAND flash units, for example, the channel CH #0 is connected to the NAND flash units 150 #0, 150 #4, 150 #8 and 150 #12. Each NAND flash unit can be packaged in an independent die. The flash I/F 139 may issue one of the CE signals CE #0 to CE #3 through the I/F 151 to activate the NAND flash units 153 #0 to 153 #3, the NAND flash units 153 #4 to 153 #7, the NAND flash units 153 #8 to 153 #11, or the NAND flash units 153 #12 to 153 #15, and read data from or program data into the activated NAND flash units in parallel.

Figure 3:
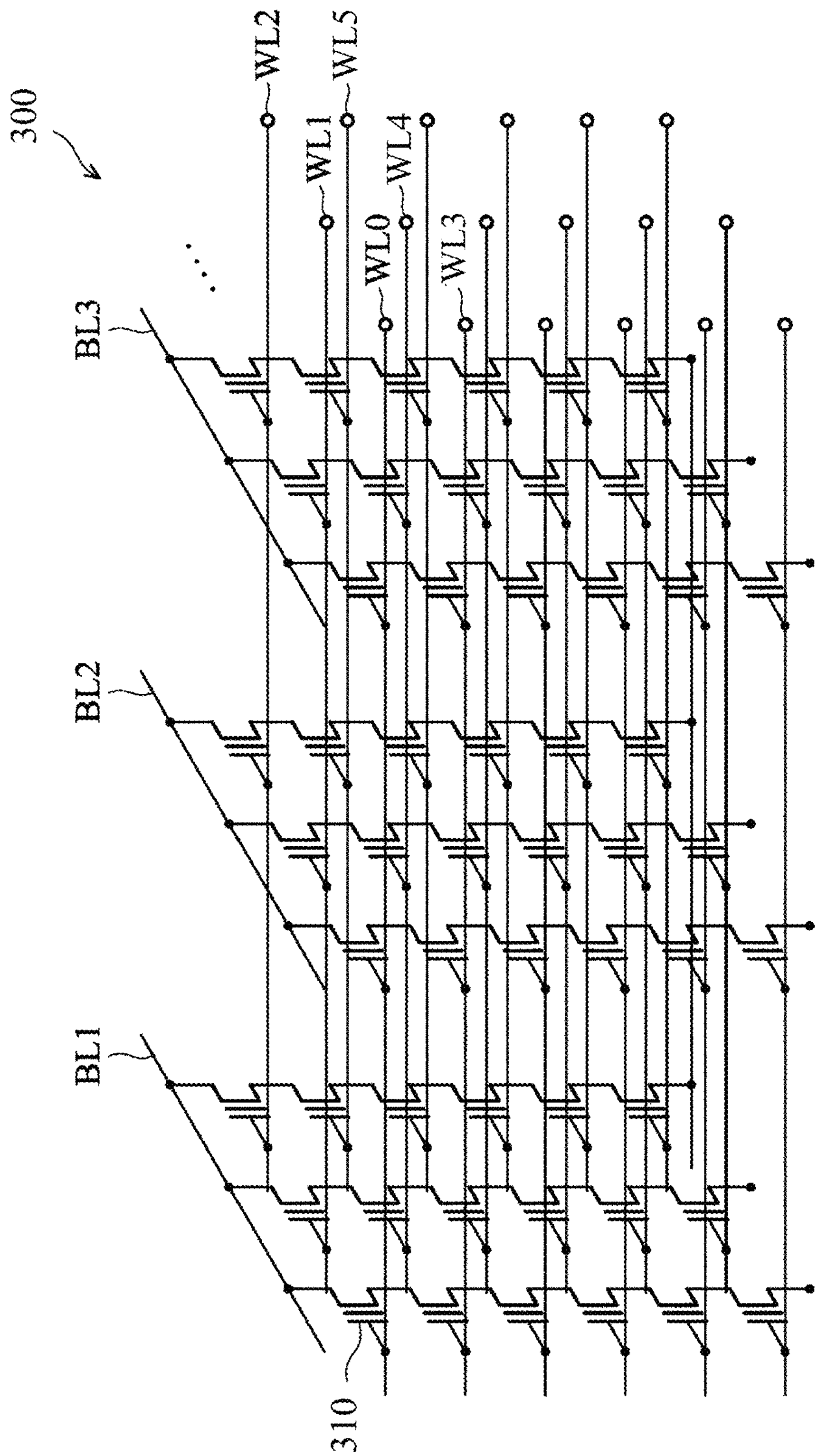
FIG. 3 is a schematic diagram showing the hardware architecture of a portion of a NAND flash unit according to an embodiment of the invention.

Refer to FIG. 3 showing the hardware architecture of a portion of a NAND flash unit. Each NAND flash unit may contain a plurality of memory blocks (e.g. the memory block 300) and the memory block 300 contains multiple memory cells, such as floating gate transistors (e.g. the floating gate transistor 310), or other charge trap devices. The structure of the memory block 300 includes bit lines and word lines. For brevity, only the bit lines BL1 to BL3 and the word lines WL0 to WL5 are labeled in FIG. 3. For example, the floating gate transistors on each word line store one or more pages of data collectively.

Each NAND flash unit may include multiple data planes, each data plane may include multiple physical blocks. In order to improve the data programming and data reading efficiency, designated physical blocks of the data planes in multiple NAND flash units are organized into one super block (SB), so that each SB contains multiple physical pages. The SB and the physical page are identified by a super-block number and a page number, respectively, and the combination is referred to as a physical address of the flash module 150.

Each SB is labeled as a data block, a current block or a system block according to its function. The processing unit 134 may select an empty SB as the current block for preparing to program user data received from the host side 110, or management information of the flash module 150. The management information may include the flash identifier (ID), the bad block table, the bad column table, the H2F tables, and so on. In order to improve the efficiency of data programming, the user data provided by the host side 110 or the management information of the flash module 150 is programmed in parallel into designated physical blocks of the SB across multiple NAND flash units. The processing unit 134 maintains the F2H table for each current block. Each F2H table contains multiple records. Each record stores the information indicating which logical address of user data that is associated with (or mapped by) a designated physical page in the current block. The records in the F2H table are stored in the order of the page numbers of physical pages in the current block. The logical address may be expressed in a logical block address (LBA), a host page number or other expression and is managed by the host side 110. For example, each LBA or host page is associated with the user data or the management information in 4K bytes. In some embodiments, the processing unit 134 may drive the flash I/F 139 to program the corresponding F2H table in the RAM 136 into the data region of the designated physical page (for example, the last physical page) of one current block after all physical pages of this current block are fully stored in user data or the remaining physical pages of this current block are filled with dummy values. The current block is changed to the data block after the corresponding F2H table has been programmed into the flash module 150, and the user data stored in the data block cannot be modified. In alternative embodiments, the processing unit 134 may drive the flash I/F 139 to program the corresponding F2H table in the RAM 136 into the data region of the designated physical page (for example, the last physical page) of one current block after all physical pages of this current block are fully stored in management information or the remaining physical pages of this current block are filled with dummy values. The current block is changed to the system block after the corresponding F2H table has been programmed into the flash module 150, and the system information stored in the data block cannot be modified. Each of the data blocks and the system blocks may be referred to as a closed clock.

In order to improve the performance of the device side, the processing unit 134 of the flash controller 130 loads and executes program codes of the firmware translation layer (FTL) for at least making a wide range of decisions and witching between different working modes when specific conditions are met. The modes include but not limited to the optimal quality of service (QoS), the optimal write amplification factor (WAF), the optimal performance, and so on. In some implementations, the manufacturer of the flash controller 130 may add program codes for situational awareness or the host pattern recognition to the FTL to achieve the above decisions and mode switches through a large number of conditional judgments and heuristics rules. However, in order to adapt to more types of flash modules 150, program codes of the FTL often need to be modified, causing the difficulty in version maintenance.

In order to solve or alleviate the technical problems caused by the above implementations, an embodiment of the present invention proposes a performance improvement mechanism based on an AI engine. The mechanism employs the AI engine 135 to make complicated decisions based on real-time operations and performs relevant tasks in light of the judgement outcomes to improve the performance of the device side. In some embodiments, the AI engine 135 is embedded in an Application-Specific Integrated Circuit (ASIC) including numerous logic gates for storing input parameters generated by the processing unit 134, executing one or more prediction models to generate prediction results according to these input parameters, and storing the prediction results to be read by the processing unit 134. In alternative embodiments, the AI engine 135 is composed of program codes, which can be loaded and executed by the processing unit 134, for executing one or more prediction models to generate prediction results based on real-time operations.

In order to generate the AI engine 135, the manufacturer of the flash controller 130 can set up a laboratory and install a training server in the laboratory. The training server executes a machine learning algorithm to generate prediction models according to training data. The training data includes a large number of samples. Each sample includes actual historical input-parameter values or simulated input-parameter values associated with executions for one or more host commands, or a period of time (independent of host commands), and output results corresponding to facts, simulated cases and/or engineer's experience. After the prediction models are trained completely, the training server generates program codes of the prediction models as the AI engine 135. In some embodiments, the manufacturer engineer stores these program codes in non-volatile storage space of a device side. The non-volatile storage space can be the space of the designated address in a read-only memory (ROM) or a static random access memory (SRAM), or the designated system block in the flash module 150. When the device side operates, the processing unit 134 loads and executes these program codes to use the well-trained prediction models to generate the prediction results according to real-time input-parameter values. In alternative embodiments, the circuit design engineer designs the ASIC of the AI engine 135 based on the well-trained prediction models, and integrate the ASIC into the flash controller 130. When the device side operates, the processing unit 134 feeds the real-time input-parameter values into the AI engine 135 and obtains the prediction results from the AI engine 135. It is noted that, since the single device side has insufficient samples, the processing unit 134 of the flash controller 130 cannot execute the machine learning algorithm to generate the prediction models.

Figure 4:
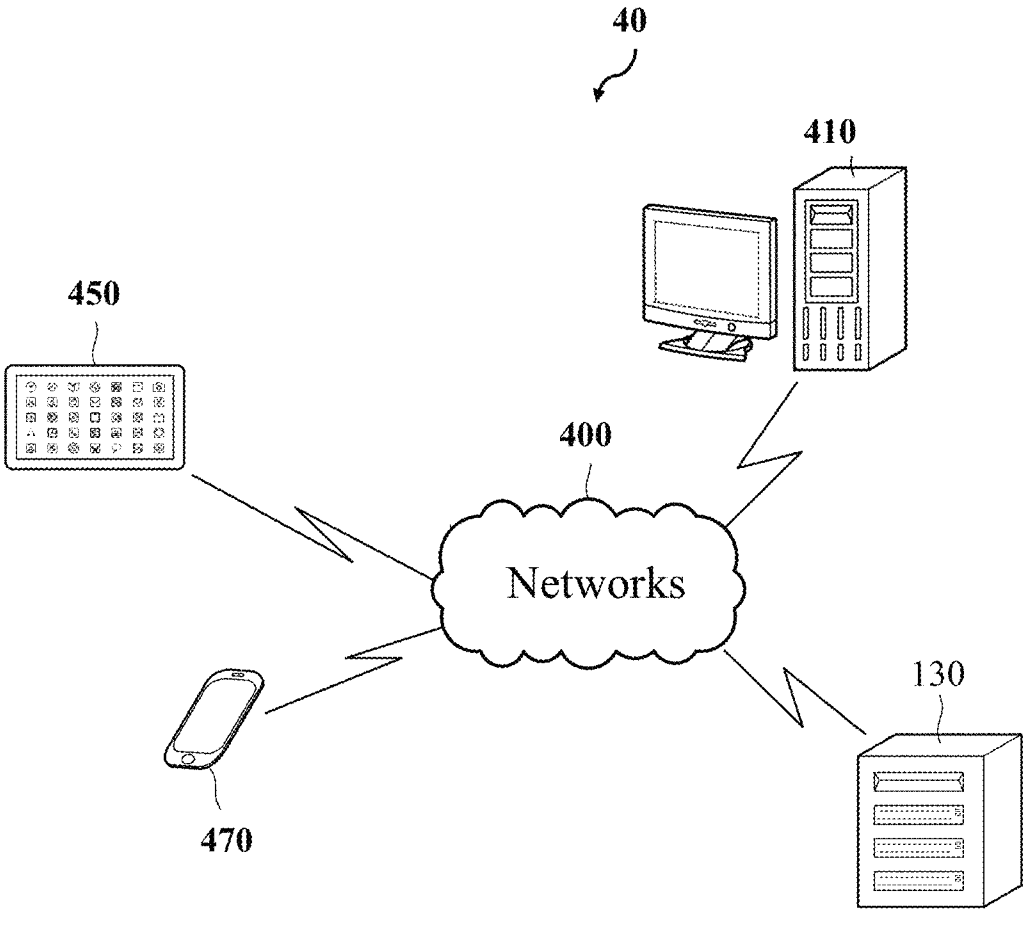
FIG. 4 is a schematic diagram showing a machine-learning and deployment system according to an embodiment of the invention.

In some embodiments, in order to update the AI engine 135, refer to FIG. 4 showing the machine-learning and deployment system 40 including the training server 410, the tablet computer 450 and the mobile phone 470. The manufacturer of the flash controller 130 sets up a laboratory and installs the training server 410 in the laboratory for executing the machine learning algorithm to generate the prediction models according to a large number of training data. After the newest prediction models are trained completely, the training server 410 generates program codes including the up-to-date prediction models. The training server 410 transmits an update message of the AI engine and the up-to-date program codes of the AI engine to the tablet computer 450 and the mobile phone 470 through the networks 400, so that the central processing unit (that is, the host side 110) in each of the tablet computer 450 and the mobile phone 470 updates the program codes of the AI engine 135 according to the instructions for replacing the original prediction models with the up-to-date prediction models. The networks 400 may be the Internet, a wired local area network (LAN), a wireless LAN, or any combination thereof. The host side 110 issues the self-defined AI engine update command and the up-to-date program codes to the flash controller 130 through the host I/F 131, so that the processing unit 134 overwrites the updated program codes to the specific address in the SRAM, or programs the updated program codes into the designated system block in the flash module 150. Although the embodiments as shown in FIG. 4 include the tablet computer 450 and the mobile phone 470 only, the training server 410 can further update the program codes of the AI engine 135 in other electronic devices, such as an external storage device, a personal computer, a notebook computer, a digital camera, a digital recorder, a smart television, a smart freezer, an automotive electronics system, etc.

The samples of training data include the following multiclass output results: host type identification; host performance identification; host application identification; garbage collection (GC) type and timing; auto write boost; wear leveling strategy; read refresh/reclaim strategy; power saving mode entrance period; power throttling; standby period for command continuity; LDPC Throughput, etc. A value is given in each class of the output results in each sample. It means that no output result is presented in a class for a sample when a value in this class of the output results in this sample is set to "0" or NULL.

A value of the host type identification can be set to an integer greater than 0 to indicate a specific host type. For example, "1" represents a mobile phone, "2" represents a personal computer, "3" represents a server, "4" represents a gaming console, etc.

Figure 5:
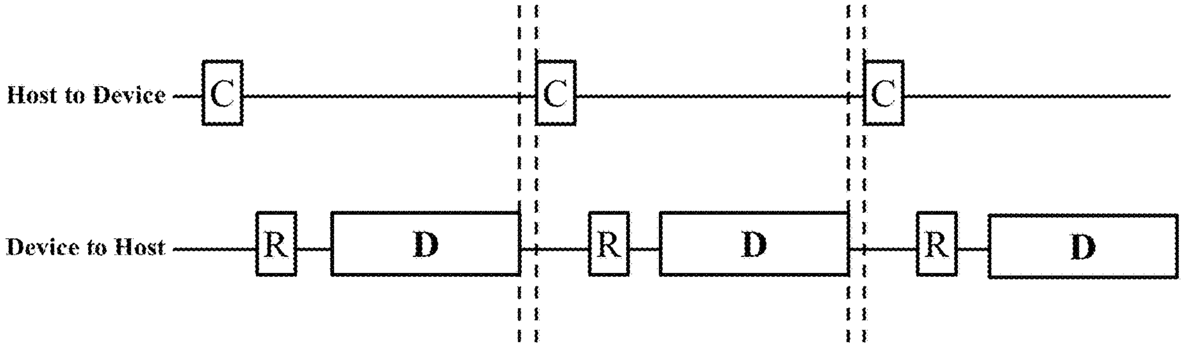
FIG. 5 is a timing diagram for communicating between a host side and a flash controller for executing host read commands according to an embodiment of the invention.
Figure 5:
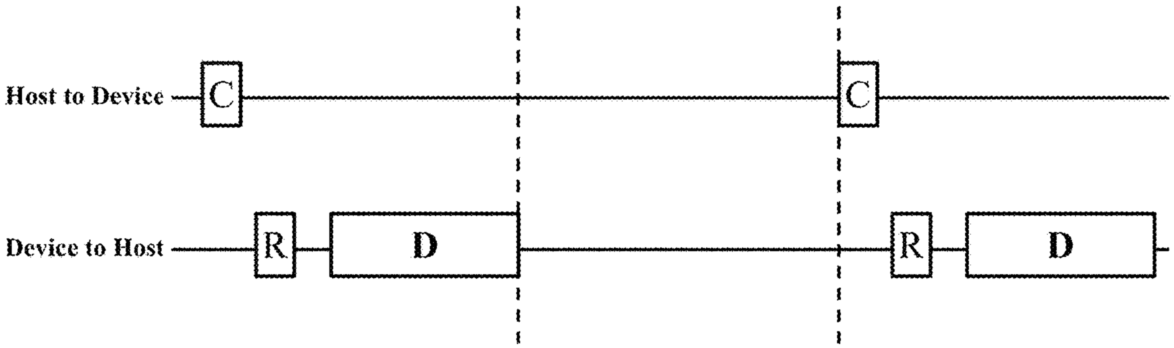

A value of the host performance identification can be set to an integer greater than 0 to indicate a busy level of the host side for driving the device side. For example, "1" represents a low level, "2" represents a medium level, "3" represents a high level, etc. Refer to FIG. 5 showing a timing diagram for communicating between the host side and the device side for executing host read commands, in which the blocks "C" denote read commands issued by the host side, the blocks "R" denote responses sent from the device side, and the blocks "D" denote user data sent from the device side. The upper part (A) in FIG. 5 shows the execution of three read commands. The host latency between the execution of two commands is shorter, which indicates a higher host performance. The lower part (B) in FIG. 5 shows the execution of two read commands. The host latency between the execution of two commands is longer, which indicates a lower host performance.

A value of the host application identification can be set to an integer greater than 0 to indicate a specific application being executed by the host side. For example, "1" represents office software, "2" represents a game, "3" represents a computer aided design (CAD), "4" represents three-dimensional graphics, "5" represents a stress test, "6" represents an audio/video playback, "7" represents a Web browser, etc.

A value of the GC type and timing can be set to an integer greater than 0 to indicate an execution mode of the GC process. For example, "1" represents an activation of the foreground GC only, "2" represents an activation of the background GC only, "3" represents an activation of both the foreground and the background GC, "4" represents a suspension of the GC, "5" represents an activation of the emergency GC, etc.

A value of the auto write boost can be set to an integer greater than 0 to indicate space of the RAM in the flash controller that is reserved for the SLC cache in bytes.

A value of the wear leveling strategy can be set to an integer greater than 0 to indicate a threshold of the program/erase (P/E) count for activating the wear leveling process. A value of the read refresh/reclaim strategy can be set to an integer greater than 0 to indicate a threshold of the read disturbance count for activating the read refresh/reclaim process.

A value of the power saving mode entrance period can be set to a floating point number greater than 0 to indicate a length of time to enter the power saving mode, for example, any number of seconds from 500 microseconds (μs) to 5 milliseconds (ms). A value of the power throttling can be set to a floating point number greater than 0 to indicate a clock adjustment coefficient of the flash controller, for example, any ratio from 0.3 to 1.1. For example, if the power throttling is set to 0.3, the frequency at which the flash controller runs is decreased to 0.3 of the preset frequency. If the power throttling is set to 1.1, the frequency at which the flash controller runs is increased to 1.1 of the preset frequency.

A value of the standby period for command continuity can be set to an integer greater than 0 to indicate a length of time used to determine command continuity, such as any number of seconds from 1 to 5 milliseconds. For example, the flash controller detects logical address ranges of all host commands to determine the continuity of these host commands within the standby period for command continuity.

A value of the LDPC throughput can be set to an integer greater than 0 to indicate a length of LDPC in bytes.

For the samples associated with host command executions, the machine learning algorithm requires to collect as widely as possible the input parameters that will affect the output results of the classes as described above. The input parameters required by the machine learning algorithm include the following categories: input/output communications between the host side and the device side; the software and the firmware status of the flash controller; and the flash module status. The first category of input parameters covers basic information of one or more host commands. The second category of input parameters covers the hardware and the firmware statuses of the flash controller when these host commands are executed. The third category of input parameters covers the flash module status when these host commands are executed. It means that no value is presented in an input parameter in a sample when a value of this input parameter in this sample is set to "0" or NULL.

Regarding the input/output communications between the host side and the device side, the input parameters include but not limited to a command type, addition command arguments, a chunk size, an address distribution, a host I/F configuration, a host latency, a host idle time, an exception event, etc. A value of the command type can be set to an integer greater than 0. For example, "1" represents a read command, "2" represents a write command, "3" represents a discard command, "4" represents a task management command (TaskMgt), "5" represents a write boost command (WriteBoost), etc. Values of the addition command arguments include but not limited to a host initiated defragmentation (HID), a priority, a file based optimization (FBO), etc. that are carried in one host command. A value of the data chunk can be set to an integer greater than 0 in bytes, such as any number of bytes from 4K to 1M. The address distribution can indicate a range of logical block addresses (LBAs). Values of the host I/F configuration include but not limited to a gear, a lane condition, a mode, and similar information when the host I/F operates. A value of the host latency can be set to an integer greater than 0, which represents a length of time that elapses after the device side executes the host command(s) until the next host command comes in. A value of the host idle time can be set to an integer greater than 0, which represents a length of time that the host side does not issue any host command to the device side. A value of the exception event can be set to an integer greater than 0. For example, "1" represents that the write protect mode is entered, "2" represents that the sudden power off recovery (SPOR) process is performed, etc.

Regarding the software and firmware statuses of the flash controller, the input parameters include but not limited to an operation mode, a clock configuration, a spare count, available capacity for the SLC cache of the flash controller, etc. A value of the operation mode of the flash controller can be set to an integer greater than 0. For example, “1” represents the normal mode, “2” represents the power saving mode, etc. A value of the clock configuration of the flash controller can be set to a floating point number greater than 0 to indicate a clock frequency in MHz. A value of the spare count of the flash controller can be set to an integer greater than 0 to indicate an available number of spare blocks that can be used in the flash module. A value of the SLC cache of the flash controller can be set to an integer greater 0 to indicate space of the RAM of the flash controller that is reserved for the SLC data in bytes.

Regarding the flash module statuses, the input parameters include but not limited to a program/erase count, a read disturbance count, etc. A value of the program/erase count of the flash module can be set to an integer greater than 0 to indicate an average of times that physical blocks in the flash module are programmed/erased currently. A value of the read disturbance of the flash module can be set to an integer greater than 0 to indicate an average of times that physical blocks in the flash module are read currently.

The machine learning algorithm analyzes the correlations among the input parameters described above according to numerous training samples first to merge any two or more highly correlated input parameters into one or more summed parameters, and generates calculation equation(s) for combining these highly correlated input parameters. For potential output results in each class, the machine learning algorithm calculates the correlation direction (such as positive or negative correlated) and the contribution degree (that is, coefficient) of each input parameter to the output results in this class, and generates one or more calculation equations including the correlation directions and the contribution degrees of all input parameters. The machine learning algorithm collects the calculation equations for generating the output results of all classes based on all input parameters to form the prediction-model candidate. The machine learning algorithm repeatedly generates (or modifies) the prediction-model candidate until the error estimation of the prediction-model candidate is lower than the expected level. The error estimation can be mean squared error (MSE), mean absolute error (MAE), mean squared logarithmic error (MSLE), etc. The prediction-model candidate with the error estimation lower than the expected level is output as a final prediction model.

The prediction model generated by the training server can be a multiclass logistic regression, a multiclass artificial neural network, a clustering, a multiclass decision forest, or other similar but different model. Since the prediction model is generated by the machine learning algorithm based on a large number of training samples derived from various types of device sides, rather than a specific device side, the prediction model can be widely applied to different types of device sides.

Figure 6:
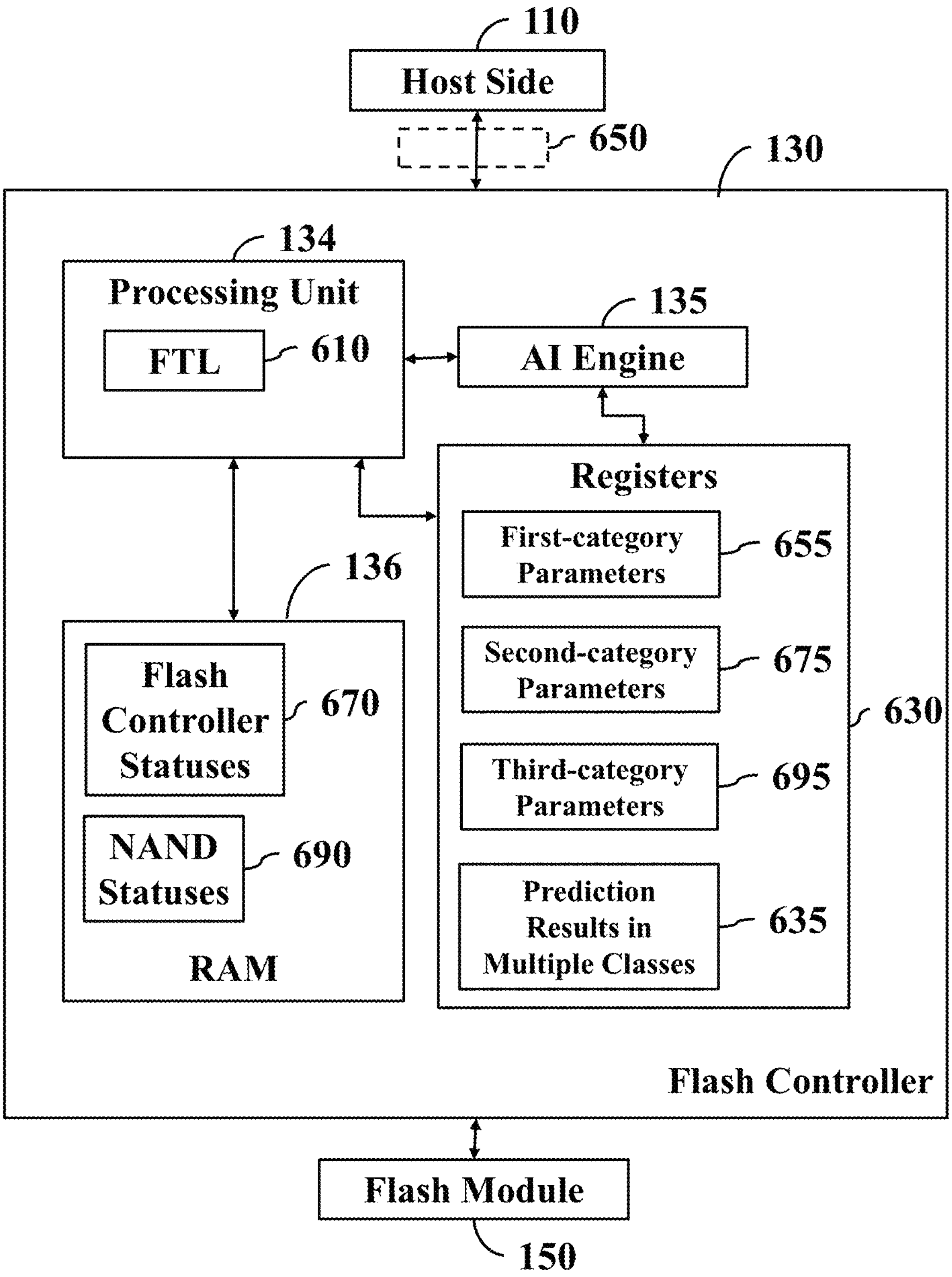
FIG. 6 is a schematic diagram for operations of an artificial intelligence (AI) engine according to an embodiment of the invention.

Refer to FIG. 6 showing a schematic diagram for the operations of the AI engine. The AI engine 135 is disposed in the flash controller 130. The AI engine 135, which includes the prediction model generated by the training server, is practiced by ASIC, or program codes that can be loaded and executed by the processing unit 134. The flash controller 130 is also provided with the registers 630, which stores the values of the first-category parameters 655, the values of the second-category parameters 675 and the values of the third-category parameters 695 to be read by the AI engine 135. In alternative embodiments, designated space of the RAM 136 is allocated for storing the values of the first-category parameters 655, the values of the second-category parameters 675 and the values of the third-category parameters 695, so that the AI engine 135 reads these parameter values from designated addresses of the RAM 136. Details of the first-category parameters 655 refer to the input parameters for the input/output communications between the host side and the device side, as described above. Details of the second-category parameters 675 refer to the input parameters for the software and firmware statuses of the flash controller, as described above. Details of the third-category parameters 695 refer to the input parameters for the flash module statuses, as described above.

The processing unit 134 when executing the program codes of the FTL 610 continuously monitors the commands and arguments 650 that the host side 110 interacts with the flash controller 130 through the host I/F 131, accordingly generates the values of the first-category parameters 655, and stores the values of the first-category parameters 655 in the registers 630 or at the designated addresses of the RAM 136. The FTL 610, during the execution of host commands, and/or the background operations, continuously updates the flash controller statuses 670 stored in the RAM 136, accordingly generates the values of the second-category parameters 675, and stores the values of the second-category parameters 675 in the registers 630 or at the designated addresses of the RAM 136. In addition, the FTL 610, during the execution of host commands, and/or the background operations, continuously updates the NAND statuses 690 stored in the RAM 136, accordingly generates the values of the third-category parameters 695, and stores the values of the third-category parameters 695 in the registers 630 or at the designated addresses of the RAM 136. The background operations include the GC process, the wear leveling process, read refresh/reclaim process, and so on.

The AI engine 135 reads the values of the first-category parameters 655, the values of the second-category parameters 675 and the values of the third-category parameters 695 updated in real time by the FTL 610 from the registers 630 or the designated addresses of the RM 136, uses the preset prediction model to calculate the prediction results in multiple classes 635 according to the values of the parameters 655, 675 and 695. Details of the prediction results in multiple classes 635 correspond to the output results in multiple classes generated by the training server, as described above. In some embodiments, the AI engine 135 writes the prediction results in multiple classes 635 in the designated addresses of the RAM 136. The FTL 610 obtains the prediction results in multiple classes from the registers 630 or the designated addresses of the RAM 136, and adjusts settings of the flash controller 130 accordingly to improve the performance of the device side.

Figure 7:
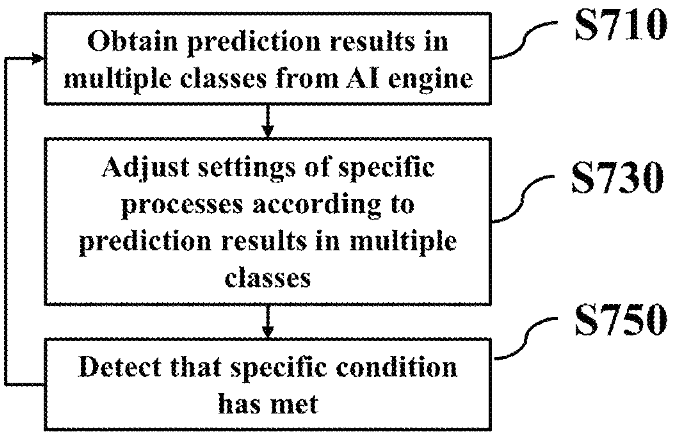
FIG. 7 is a flowchart illustrating a method for improving performance based on an AI engine according to an embodiment of the invention.

Refer to FIG. 7 showing a flowchart of a method for improving performance based on an AI engine, which is performed by the processing unit 134 when loading and executing program codes of the FTL. The method repeatedly executes a loop for continuously adjusts settings of specific processes according to the prediction results of multiple classes generated by the AI engine 135 in real time. Detailed descriptions are described as follows:

Step S710: The prediction results of multiple classes are obtained from the AI engine 135. In some embodiments, the AI engine 135 continuously updates the prediction results in multiple classes 635 stored in the registers 630 or the designated addresses of the RAM 136, and the FTL reads the prediction results in multiple classes 635 from the registers 630 or the designated addresses of the RAM 136. In alternative embodiments, the FTL queries the AI engine 135 and the AI engine 135 replies with the prediction results in multiple classes 635 to the FTL.

Step S730: Settings of specific processes are adjusted according to the prediction results in multiple classes 635. These processes include but not limited to the GC process, the wear leveling process, the auto write boost process, the read refresh/reclaim process, the power-saving mode process, the power throttling process, and so on.

Figure 8:
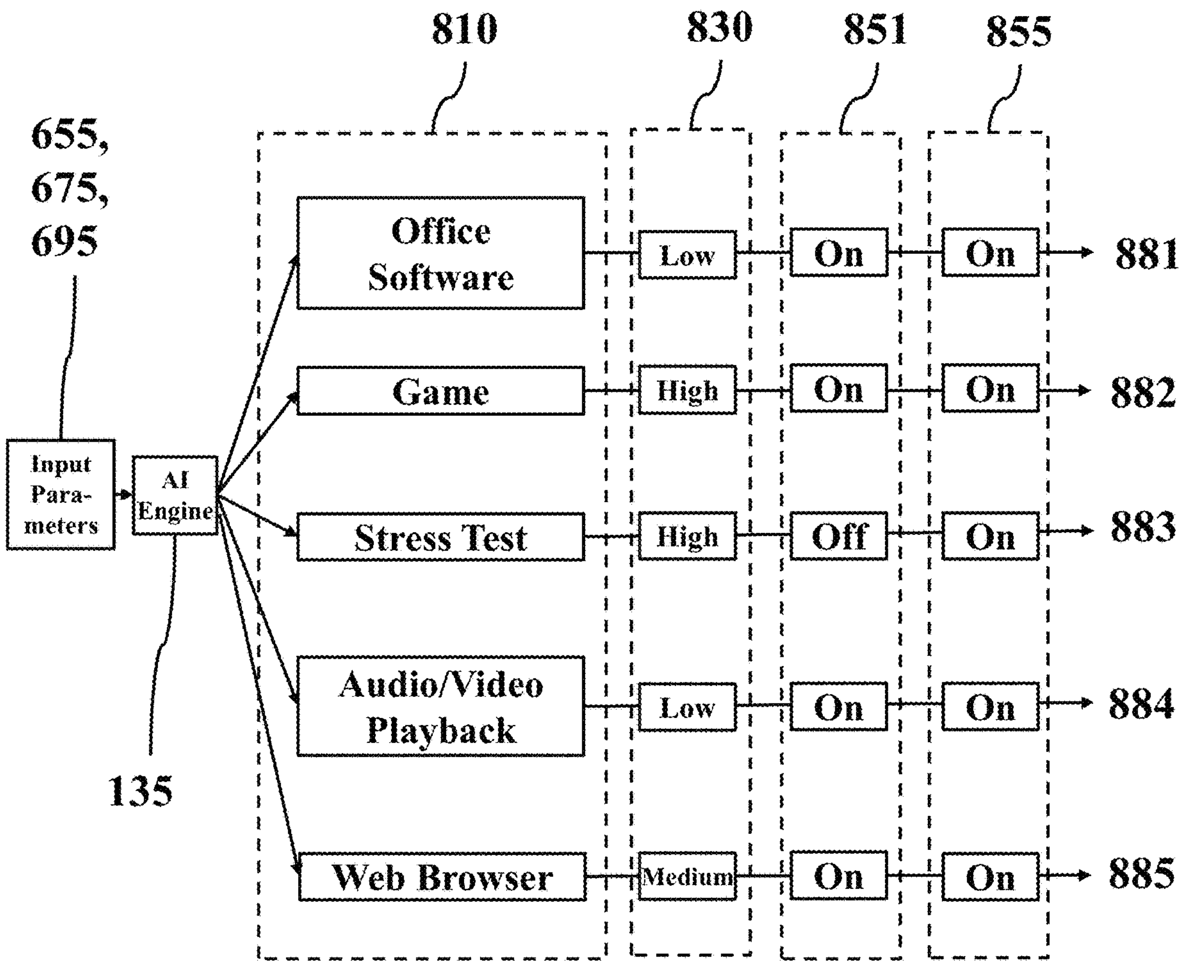
FIG. 8 is a schematic diagram for adjusting settings of a garbage collection (GC) process according to an embodiment of the invention.

In some embodiments, refer to FIG. 8 showing a schematic diagram for adjusting settings of the GC process. The AI engine 135 generates the host application identification 810, the host performance identification 830, and the foreground GC recommendation 851 and the background GC recommendation 855 of the GC type and timing of the prediction results according to the values of the input parameters 655, 675 and 695.

In the use case 881, the prediction results indicate that the currently executed host application is office software, the busy level between the host side and the device side is low, and both the foreground GC process and the background GC process are suggested to turn on (or activate). The FTL not only activates the foreground GC process and the background GC process according to the prediction results, but also sets the execution time of each batch in the foreground GC process and the background GC process to a shorter time period according to the information about the currently executed host application, and the busy level between the host side and the device side.

The foreground GC process is the process to insert multiple batches of GC operations to release more available space in the flash module 150 during the executions of host commands. The background GC process is the process to perform one or more batches of GC operations to release more available space in the flash module 150 during the power saving mode by the flash controller 130.

In the use case 882, the prediction results indicate that the currently executed host application is a game, the busy level between the host side and the device side is high, and both the foreground GC process and the background GC process are suggested to turn on (or activate). The FTL not only activates the foreground GC process and the background GC process, but also sets the execution time of each batch in the foreground GC process and the background GC process to a longer time period according to the prediction results.

In the use case 883, the prediction results indicate that the currently executed host application is a stress test, the busy level between the host side and the device side is high, the foreground GC process is suggested to turn off (or de-activate), and the background GC process is suggested to turn on (or activate). The FTL not only de-activates the foreground GC process and activates the background GC process, but also sets the execution time of each batch in the background GC process to a shorter time period according to the prediction results.

In the use case 884, the prediction results indicate that the currently executed host application is an audio/video playback, the busy level between the host side and the device side is low, and both the foreground GC process and the background GC process are suggested to turn on (or activate). The FTL not only activates the foreground GC process and the background GC process, but also sets the execution time of each batch in the foreground GC process and the background GC process to a shorter time period according to the prediction results.

In the use case 885, the prediction results indicate that the currently executed host application is a Web browser, the busy level between the host side and the device side is medium, and both the foreground GC process and the background GC process are suggested to turn on (or activate). The FTL not only activates the foreground GC process and the background GC process, but also sets the execution time of each batch in the foreground GC process to a shorter time period and sets the background GC process to a medium time period according to the prediction results.

In alternative embodiments, the FTL refers to the auto write boost of the prediction results to reset the space reserved for the SLC cache in the RAM 136. The flash controller 130 activates the auto write boost process for accelerating the execution performance of the host write commands. In the auto write boost process, the processing unit 134 allocates space for the SLC cache in the RAM 136 for storing user data to be programmed into the flash module 150. Once the to-be-programmed user data instructed by a host write command has been successfully stored in the SLC cache in the RAM 136, the processing unit 134 replies to the host side 110 with a message indicating that the host write has been successfully executed through the host I/F 131. The processing unit 134 drives the flash I/F 139 to program the user data in the SLC cache in the RAM 136 into designated physical addresses of the flash module 150 until a preset condition has been met.

In alternative embodiments, the FTL refers to the wear leveling strategy and the read refresh/reclaim strategy of the prediction results to reset thresholds of the program/erase count and the read disturbance count.

The flash controller 130 activates the wear leveling process to average the wear degree of the SBs in the flash module 150 and prolong the service life of the flash module 150. The flash controller 130 continuously calculates the program/erase count of each SB. When detecting that any data block or any system block with the program/erase count higher than the threshold, the processing unit 134 activates the wear leveling process to migrate the user data stored in this data block or the management information stored in this system block to a current block.

The flash controller 130 activates the read refresh/reclaim process to average the read degree of the SBs in the flash module 150 and prolong the service life of the flash module 150. The flash controller 130 continuously calculates the read disturbance count of each SB. When detecting that any data block or any system block with the read disturbance count higher than the threshold, the processing unit 134 activates the read refresh/reclaim process to migrate the user data stored in this data block or the management information stored in this system block to a current block.

In alternative embodiments, the FTL refers to the power saving mode entrance period of the prediction results and instructs the flash controller 130 to enter the power saving mode for a recommended period of time.

In alternative embodiments, the FTL refers to the power throttling of the prediction results to adjust the clock of the flash controller 130 to the specified level.

In alternative embodiments, the FTL refers to the standby period for command continuity of the prediction results to adjust the length of the data buffer in the RAM 136, so that the data buffer can store more than the specified number of seconds of host commands.

In alternative embodiments, the FTL refers to the LDPC throughput of the prediction results to modify the length of LDPC that is generated according to user data.

Step S750: It is detected that the specific condition has met. In some embodiments, after the adjustment in step S730 is completed, the FTL starts a timer to count for a period of time, such as n seconds, where n is a floating point number greater than 0. Once the timer counts out this period of time, a signal is sent to the FTL, indicating that the specific condition is met.

Although the invention is illustrated and described herein with reference to specific embodiments, the invention is not intended to be limited to the details shown. Rather, various modifications may be made in the details within the scope and range of equivalents of the claims and without departing from the invention. It is to be understood that the above description is illustrative of the invention and is not to be construed as limiting the invention. Various modifications, applications and/or combinations of the embodiments may occur to those skilled in the art without departing from the scope of the invention as defined by the claims.

One having ordinary skill in the art will readily understand that the invention as discussed above may be practiced with hardware elements in configurations which are different than those which are disclosed. Therefore, although the invention has been described based upon these preferred embodiments, it would be apparent to those skilled in the art that certain modifications, variations, and alternative constructions would be apparent, while remaining within the scope of the invention.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent." etc.)

The term "device" or "module" is not limited to one or a specific number of physical objects (such as one smartphone, one controller, one processing system and so on). As used herein, a device may be any electronic device with one or more parts that may implement at least some portions of the invention in this disclosure. While the description and examples use the term "device" or "module" to describe various aspects of this disclosure, the term "device" or "module" is not limited to a specific configuration, type, or number of objects. Additionally, the term "system" or "module" is not limited to multiple components or specific aspects. For example, a system may be implemented on one or more printed circuit boards or other substrates and may have movable or static components. While the description and examples use the term "system" to describe various aspects of the invention in this disclosure, the term "system" is not limited to a specific configuration, type, or number of objects.

Specific details are provided in the description above to provide a thorough understanding of the aspects and examples provided herein. However, it will be understood by one of ordinary skills in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Some or all of the aforementioned embodiments of the method of the invention may be implemented in a computer program such as a driver for a dedicated hardware, a Firmware Translation Layer (FTL) of a storage device, or others. Other types of programs may also be suitable, as previously explained. Since the implementation of the various embodiments of the present invention into a computer program can be achieved by the skilled person using his routine skills, such an implementation will not be discussed for reasons of brevity. The computer program implementing some or more embodiments of the method of the present invention may be stored on a suitable computer-readable data carrier, or may be located in a network server accessible via a network such as the Internet, or any other suitable carrier.

A computer-readable storage medium includes volatile and non-volatile, removable and non-removable media implemented in any method or technology for storage of information such as computer-readable instruction, data structures, program modules, or other data. A computer-readable storage medium includes, but is not limited to, RAM, ROM, EEPROM, flash memory or other memory, CD-ROM, digital versatile disks (DVD), Blue-ray disk or other optical storage, magnetic cassettes, magnetic tape, magnetic disk or other magnetic storage devices, or any other medium which can be used to store the desired information and may be accessed by an instruction execution system. Note that a computer-readable medium can be paper or other suitable medium upon which the program is printed, as the program can be electronically captured via, for instance, optical scanning of the paper or other suitable medium, then compiled, interpreted, or otherwise processed in a suitable manner, if necessary, and then stored in a computer memory.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

The various illustrative logical blocks, modules, engines, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

Although the embodiment has been described as having specific elements in FIGS. 1-3, and 6, it should be noted that additional elements may be included to achieve better performance without departing from the spirit of the invention. Each element of FIGS. 1-3, and 6 is composed of various circuitries and arranged to operably perform the aforementioned operations. While the process flows described in FIG. 7 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for improving performance, performed by a processing unit when loading and executing program codes of a firmware translation layer (FTL), wherein a flash controller comprises the processing unit and an artificial intelligence (AI) engine, and the flash controller is coupled to a host and a flash module, the method comprising:

generating a value of a first-category parameter according to a command and an argument that the host interacts with the flash controller;

generating a value of a second-category parameter according to a software status and a firmware status of the flash controller;

generating a value of a third-category parameter according to a status of the flash module, thereby enabling a prediction model running in the AI engine to generate prediction results in a plurality of classes according to the value of the first-category parameter, the value of the second-category parameter and the value of the third-category parameter, wherein a training server uses a machine learning algorithm to generate the prediction model according to training data; and adjusting a setting of a process being performed in the flash controller according to the prediction results in the classes.

2. The method of claim 1, wherein the AI engine is embedded in an application-specific integrated circuit (ASIC).

3. The method of claim 1, wherein the AI engine is composed of program codes, which is loaded and executed by the processing unit.

4. The method of claim 3, comprising:

receiving an AI engine update command and updated program codes for the AI engine from the host; and replacing the program codes of the AI engine with the updated program codes, wherein the updated program codes comprise an up-to-date prediction model.

5. The method of claim 1, wherein the prediction model is a multiclass logistic regression, a multiclass neural network, a clustering or a multiclass decision forest.

6. The method of claim 1, wherein the prediction results in the classes comprise a host application identification, a host performance identification, a foreground garbage collection (GC) recommendation and a background GC recommendation, the method comprising:

setting a time period of each batch in a foreground GC process according to the host application identification, the host performance identification and the foreground GC recommendation of the prediction results; and setting a time period of each batch in a background GC process according to the host application identification, the host performance identification and the background GC recommendation of the prediction results.

7. The method of claim 1, wherein the prediction results in the classes comprise an auto write boost, the method comprising:

resetting space reserved for a cache in a random access memory for a host write command according to the auto write boost of the prediction results.

8. The method of claim 1, wherein the prediction results in the classes comprise a wear leveling strategy, the method comprising:

resetting a threshold of a program/erase count according to the wear leveling strategy of the prediction results.

9. The method of claim 1, wherein the prediction results in the classes comprise a read refresh/reclaim strategy, the method comprising:

resetting a threshold of a read disturbance count according to the read refresh/reclaim strategy of the prediction results.

10. The method of claim 1, wherein the prediction results in the classes comprise a power saving mode entrance period, the method comprising:

instructing the flash controller to enter a power saving mode for a period of time according to the power saving mode entrance period of the prediction results.

11. The method of claim 1, wherein the prediction results in the classes comprise a power throttling, the method comprising:

adjusting a clock of the flash controller according to the power throttling of the prediction results.

12. A non-transitory computer-readable storage medium having stored therein program code, wherein a flash controller comprises a processing unit and an artificial intelligence (AI) engine, the flash controller is coupled to a host and a flash module, and the program code when loaded and executed by the processing unit causes the processing unit to:

generate a value of a first-category parameter according to a command and an argument that the host interacts with the flash controller;

generate a value of a second-category parameter according to a software status and a firmware status of the flash controller;

generate a value of a third-category parameter according to a status of the flash module, thereby enabling a prediction model running in the AI engine to generate prediction results in a plurality of classes according to the value of the first-category parameter, the value of the second-category parameter and the value of the third-category parameter, wherein a training server uses a machine learning algorithm to generate the prediction model according to training data; and adjust a setting of a process being performed in the flash controller according to the prediction results in the classes.

13. An apparatus for improving performance, disposed in a flash controller, wherein the flash controller is coupled to a host and a flash module, the apparatus comprising:

an artificial intelligence (AI) engine; and a processing unit, coupled to the AI engine, arranged operably to:

generate a value of a first-category parameter according to a command and an argument that the host interacts with the flash controller;

generate a value of a second-category parameter according to a software status and a firmware status of the flash controller;

generate a value of a third-category parameter according to a status of the flash module, thereby enabling a prediction model running in the AI engine to generate prediction results in a plurality of classes according to the value of the first-category parameter, the value of the second-category parameter and the value of the third-category parameter, wherein a training server uses a machine learning algorithm to generate the prediction model according to training data; and adjust a setting of a process being performed in the flash controller according to the prediction results in the classes.

14. The apparatus of claim 13, wherein the AI engine is embedded in an application-specific integrated circuit (ASIC).

15. The apparatus of claim 13, wherein the AI engine is composed of program codes, which is loaded and executed by the processing unit.

16. The apparatus of claim 15, wherein the processing unit is arranged operably to:

receive an AI engine update command and updated program codes for the AI engine from the host; and replace the program codes of the AI engine with the updated program codes, wherein the updated program codes comprise an up-to-date prediction model.

17. The apparatus of claim 13, wherein the prediction model is a multiclass logistic regression, a multiclass neural network, a clustering or a multiclass decision forest.

18. The apparatus of claim 13, wherein the prediction results in the classes comprise a host application identification, a host performance identification, a foreground garbage collection (GC) recommendation and a background GC recommendation, and the processing unit is arranged operably to: set a time period of each batch in a foreground GC process according to the host application identification, the host performance identification and the foreground GC recommendation of the prediction results; and set a time period of each batch in a background GC process according to the host application identification, the host performance identification and the background GC recommendation of the prediction results.

19. The apparatus of claim 13, wherein the prediction results in the classes comprise an auto write boost, and the processing unit is arranged operably to: reset space reserved for a cache in a random access memory for a host write command according to the auto write boost of the prediction results.

20. The apparatus of claim 13, wherein the prediction results in the classes comprise a wear leveling strategy, and the processing unit is arranged operably to: reset a threshold of a program/erase count according to the wear leveling strategy of the prediction results.

21. The apparatus of claim 13, wherein the prediction results in the classes comprise a read refresh/reclaim strategy, and the processing unit is arranged operably to: reset a threshold of a read disturbance count according to the read refresh/reclaim strategy of the prediction results.

22. The apparatus of claim 13, wherein the prediction results in the classes comprise a power saving mode entrance period, and the processing unit is arranged operably to: instruct the flash controller to enter a power saving mode for a period of time according to the power saving mode entrance period of the prediction results.

23. The apparatus of claim 13, wherein the prediction results in the classes comprise a power throttling, and the processing unit is arranged operably to: adjust a clock of the flash controller according to the power throttling of the prediction results.

* * * * *